(12) United States Patent
Chen et al.

(10) Patent No.: US 7,418,380 B2
(45) Date of Patent: Aug. 26, 2008

(54) DIGITAL AUDIO DECODER HAVING ERROR CONCEALMENT USING A DYNAMIC RECOVERY DELAY AND FRAME REPEATING AND ALSO HAVING FAST AUDIO MUTING CAPABILITIES

(75) Inventors: Hua Chen, San Jose, CA (US); Ikuo Tsukagoshi, Sunnyvale, CA (US); Milan Mehta, Fremont, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 568 days.

(21) Appl. No.: 10/839,018

(22) Filed: May 4, 2004

(65) Prior Publication Data
US 2004/0210329 A1    Oct. 21, 2004

Related U.S. Application Data

(62) Division of application No. 09/422,134, filed on Oct. 20, 1999, now Pat. No. 6,915,263.

(51) Int. Cl.
G10L 21/00    (2006.01)

(52) U.S. Cl. .................................................... 704/226

(58) Field of Classification Search ........................ None
See application file for complete search history.

(56) References Cited

U.S. PATENT DOCUMENTS

| | | | |
|---|---|---|---|
| 5,309,443 A | 5/1994 | Schorman | |
| 5,533,133 A | 7/1996 | Lamkin et al. | |
| 5,943,347 A | 8/1999 | Shepard | |
| 6,369,855 B1 * | 4/2002 | Chauvel et al. | 348/423.1 |
| 6,915,263 B1 | 7/2005 | Chen et al. | |

* cited by examiner

Primary Examiner—David R. Hudspeth
Assistant Examiner—Jakieda R Jackson

(57) ABSTRACT

A multimedia decoder unit having error concealment and fast muting capabilities. The audio decoder provides error concealment using a dynamic recovery delay that is based on the error rate of an input digital bitstream and also uses frame repeating. The decoder allows fast audio muting whereby audio can be muted within two audio frames of a mute signal that immediately freezes the video frame, e.g., a channel change. With respect to the dynamic recovery delay, a template of fixed length is used to inspect the last frames within the template. If error is found, then the error sum is used as an index into a table length which provides a dynamic template length. Error within the dynamic template length is computed and if larger than a tolerance, the current frame is muted. This allows the recovery delay to be adaptive and based on the error rate while still allowing mute merging. Muting the current frame can be achieved by repeating the previous frame but the delay data of the last block of the previous audio frame is added to the first block of the repeated audio frame to provide a smooth frame interface. In response to a mute command, the decoder zeros the audio output bitstream stream to provide zero frames at the audio output buffer (AOB). In addition, the decoder also directly zeros audio frames in the AOB that lie between its the read and write pointers to guarantee that only two frames of audio be played after the mute signal.

12 Claims, 18 Drawing Sheets

DIGITAL AUDIO DECODER HAVING ERROR CONCEALMENT USING A DYNAMIC RECOVERY DELAY AND FRAME REPEATING AND ALSO HAVING FAST AUDIO MUTING CAPABILITIES

This is a divisional of application No. 09/422,134 filed on Oct. 20, 1999 now U.S. Pat. No. 6,915,263.

BACKGROUND OF THE INVENTION

1. Field of the Invention

The present invention relates to the field of multimedia electronic systems. More particularly, the present invention relates to an audio decoder unit for decoding digital multimedia bitstreams representing audio information.

2. Related Art

Audio/visual (AV) material is increasingly stored, transmitted and rendered using digital data. Digital video representation of AV material facilitates its usage with computer controlled electronics and also facilitates high quality image and sound reproduction. Digital AV material is typically compressed ("encoded") in order to reduce the computer resources required to store and transmit the digital data. The systems that transmit multimedia content encode and/or compress the content to use their transmission channel efficiently because the size of the multimedia content, especially video, is very large. For instance, in order to more efficiently broadcast or record audio signals, the amount of information required to represent the audio signals can be reduced. In the case of digital audio signals, the amount of digital information needed to accurately reproduce the original pulse code modulation (PCM) samples can be reduced by applying a digital compression process, such as AC3, for instance, resulting in a digitally compressed representation of the original sample.

Digital AV material can be encoded using a number of well known standards including, for example, the AC3 audio standard, the DV (Digital Video) standard, the MPEG (Motion Picture Expert Group) standard, the JPEG standard, the H.261 standard, the H.263 standard and the Motion JPEG standard to name a few. The encoding standards also specify the associated decoding processes as well. The multimedia contents are typically stored on the storage media and are transmitted as bitstreams which represent audio for video frames. In particular, the ATSC digital terrestrial transmission standard adopts the AC3 format for audio encoding and the MPEG2 format for video encoding.

MPEG is the compression standard for audio, video and graphics information and includes, for example, MPEG1, 2, 4 and 7. It is standardized in the ISO-IEC/JTC1/SC29/WG11 documents. MPEG1 is the standard for encoding audio and video data for storage on CD-ROM devices (compact disc read only memory). The MPEG1 specification is described in the IS-11393 standard. MPEG2 is the standard (adopted for ATSC) for encoding, decoding and transmitting video data for storage media, e.g., DVD (digital video disc), etc., and also for digital broadcasts. MPEG2 supports interlaced video while MPEG1 does not. Therefore, MPEG2 is used for high quality video displaying on TV units. The MPEG2 specification is described in IS-13818. The MPEG4 standard is used for encoding, decoding and transmitting audio, video and computer graphics data. It supports content based bitstream manipulation and representation. The specification is described in IS14496. MPEG7 is the standard of the meta information of multimedia (MM) contents. The example of the meta data is data is describes or is related to the MM contents, such as, identification and/or other descriptions of the author, producer information, directors, actors, etc. The MPEG7 standard is currently under standardization, and is in draft form but available. The draft specifications are described in the ISO-IEC-JTC1/SC29/WG11 documents.

One problem with using encoded digital audio information is that errors can occur between the transmission and reception of the audio data. The decoder unit can detect when a particular frame of the audio data contains error by using well known CRC checking schemes. In the past, the frame having the error would be muted by filling in the frame with zeros. This is called a hard mute. However, the hard mute, when played back, causes a very audible "pop" sound which is not pleasing to the ear nor does it sound natural. Therefore, an attenuation function or "window" was applied to the error frame to soften the mute. However, even soft mutes can have a "pop" associated therewith depending on the window function applied. Also, hard and soft mutes still have a duration of silence associated therewith that can be distinguished by the ear. Therefore, when many error frames are detected in the same bitstream neighborhood, these intermittent durations of silence (mutes) followed by sound (unmute) and silence again (mute) can be very unappealing to the ear and annoying and can also damage speaker systems.

Another problem with using encoding digital audio information involves muting commands and audio signal synchronization. For instance, if a user watching a program on a digital TV changes the current channel, the currently played AV information should stop incident to the channel change, e.g., mute the audio and freeze the video, then the channel should change. However, in conventional systems, audio artifacts can result because the audio may not mute fast enough as a result of situations described below. The video signal is used as a master and the audio signal is the slave in many encoding schemes. Also, the amount of playback time in a video frame may not be exactly the same as in a video frame in many encoding standards. Therefore, the audio frames and video frames are not exactly synchronized in the decoding and playback processes. Secondly, the channel change operation takes some time to complete because the AV system needs to parse the bitstream from the new channel and feed the data to corresponding audio and video decoders. This results in a situation where the audio and video are slightly delayed during decoding and playback. When the decoder receives a mute command, it is able to immediately freeze the video frame, because the video signal is the master. However, many decoded audio frames may be stored in the output buffer, resulting in some audio playback after the video freeze. This is very noticeable to the ear and confusing because the audio playback coincides with video frames that are not displayed simultaneously.

SUMMARY OF THE INVENTION

Accordingly, the present invention provides an audio decoder unit that merges nearby muted ("error") frames to extend a silence period between the error frames when the error rate is high. By extending the silence period, a more natural and less annoying sound results when the bitstream includes many nearby errors. This mute merging can be accomplished using a dynamically adjusted recovery delay period that is adaptive based on the error rate. By extending the recovery period, mutes are merged, e.g., non-error frames are muted to provide a longer mute duration. The present invention also applies a novel frame repeating technique for frame muting to conceal single silent frame periods without "pops" or other audio artifacts that result during single frame muting. In addition, the present invention provides an effective mechanism for guaranteeing that only two audio frames are played back incident to a mute command. This provides a better sounding channel change.

A multimedia information decoder unit having error concealment and fast muting capabilities. The audio decoder provides error concealment using a dynamic recovery delay that is based on the error rate of an input digital bitstream and also uses frame repeating. The decoder also allows fast audio muting whereby audio can be muted within two audio frames of a mute signal that immediately freezes the video frame, e.g., for use in a channel change situation. With respect to the dynamic recovery delay, a template of fixed length, e.g., 24 audio frames, is used to inspect the last frames within the template. If error is found in this fixed template, then the error sum is used as an index into a table length which provides a dynamic template length. Error within the dynamic template length is then computed and if larger than a prescribed tolerance, the current frame is muted. This allows the recovery delay to be adaptive and based on the error rate while still allowing mute merging. When muting is performed, smoothed muting can be used in one embodiment and in another embodiment, frame repeating can be performed.

In cases when only one bad frame appears within a neighborhood of otherwise good frames, a single frame mute can be performed. In accordance with the present invention, muting the current frame can also be achieved by repeating, in the time domain, the previous frame. In single frame muting cases, the delay data of the last block of the previous audio frame is added to the first block of the repeated audio frame to provide a smooth interface between the repeated frame. Before the addition, data reordering and weighting are performed. In response to a mute command (e.g., incident to a channel change), the decoder zeros the audio output bitstream stream to provide zero frames at the audio output buffer (AOB). In addition, the decoder also directly zeros audio frames in the AOB that lie between its the read and write pointers to guarantee that only two frames of audio be played after the mute signal.

More specifically, A first embodiment of the present invention is drawn to a method for muting a portion of an encoded bitstream of audio information comprising the steps of: a) with respect to a current encoded audio frame of the encoded bitstream, computing a length of a dynamic template based on an error rate of the encoded bitstream, the dynamic template encompassing a plurality of previous encoded frames of the encoded bitstream; b) summing errors of the plurality of previous encoded frames within the dynamic template to produce a first error sum; c) determining if the first error sum exceeds a prescribed tolerance; and d) adaptively merging muted error frames by muting the current encoded audio frame provided the first error sum value exceeds the prescribed tolerance whether or not the current encoded audio frame has an error. A variation of the first embodiment further includes a method as described above wherein the step a) comprises the steps of: a1) with respect to the current encoded audio frame, summing errors of a plurality of previous encoded frames encompassed by a fixed-length template to produce a second error sum; and a2) using the second error sum as an index to a look-up table to compute the length of the dynamic template.

A second embodiment of the present invention includes a method for muting a portion of an encoded bitstream of audio information comprising the steps of: a) detecting if a current encoded audio frame of the encoded bitstream contains an error; and b) provided an error is detected, repeating a previous decoded audio frame in lieu of the current encoded audio frame, the step b) comprising the steps of: b1) obtaining decoded data of the previous audio frame; b2) generating a repeated audio frame by replicating the decoded data of the previous audio frame for use in lieu of the current encoded audio frame; b3) modifying the repeated audio frame by adding delay information of a last block of the previous audio frame with pulse code modulated (PCM) data of a first block of the repeated audio frame to generate new decoded data for the first block of the repeated audio frame; and b4) sending the repeated audio frame to an audio output buffer for playout.

A third embodiment of the present invention includes a method (within a digital decoder) for reducing audio frame over-run comprising the steps of: a) responsive to an audio mute signal, causing an input audio encoded bitstream to zero, the step a) causing entries in an audio output buffer to zero starting from an entry position pointed to by a write pointer associated with the audio output buffer; and b) directly zeroing a plurality of entries of the audio output buffer in response to the audio mute signal, the plurality of entries being a few entries away from a read pointer of the audio output buffer, the read pointer following the write pointer and wherein as a result of step a) and step b), only a predetermined number of audio output frames are guaranteed to be played after the audio mute signal is detected.

DETAILED DESCRIPTION OF THE INVENTION

In the following detailed description of the present invention, a digital audio decoder system for a multimedia information system having improved error concealment functionality, improved muting capabilities and reduced audio frame overrun in response to a mute command, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Audio Decoder System

Figure 1A:
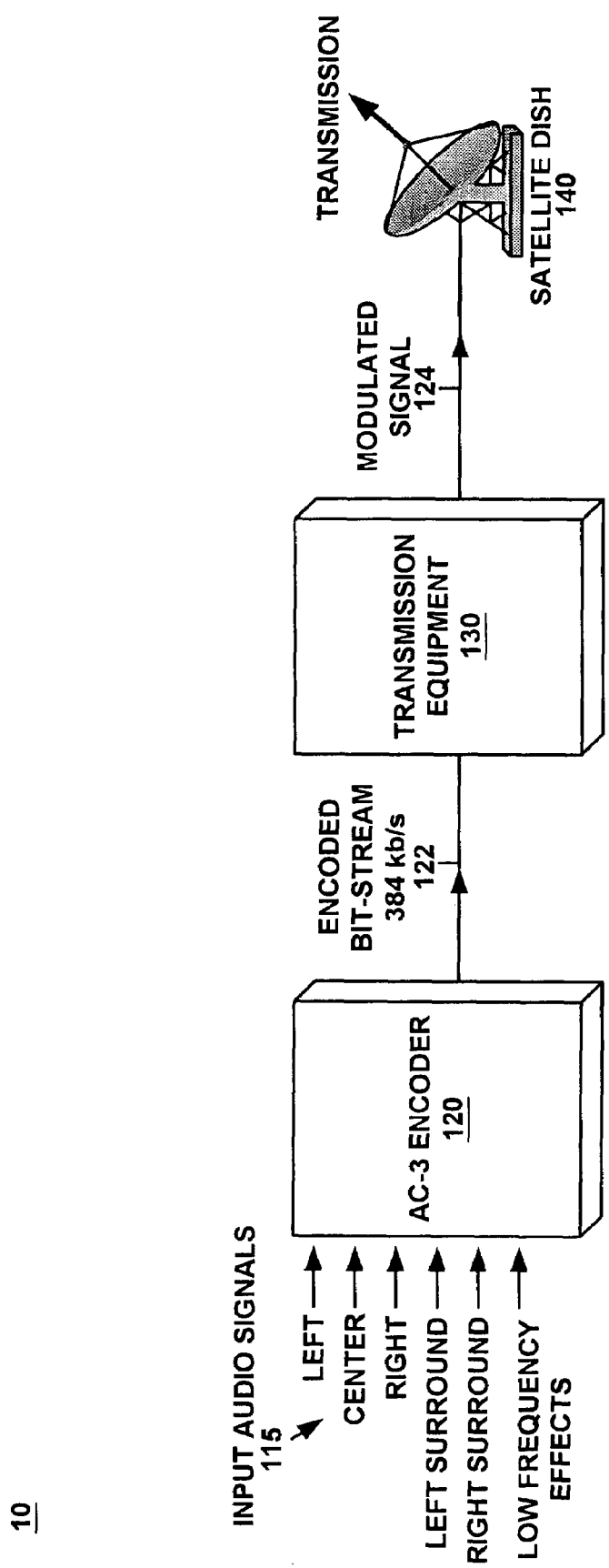
FIG. 1A and FIG. 1B illustrate an exemplary multimedia communication system including a transmission system having an encoder and a reception system having a decoder unit.
Figure 1B:
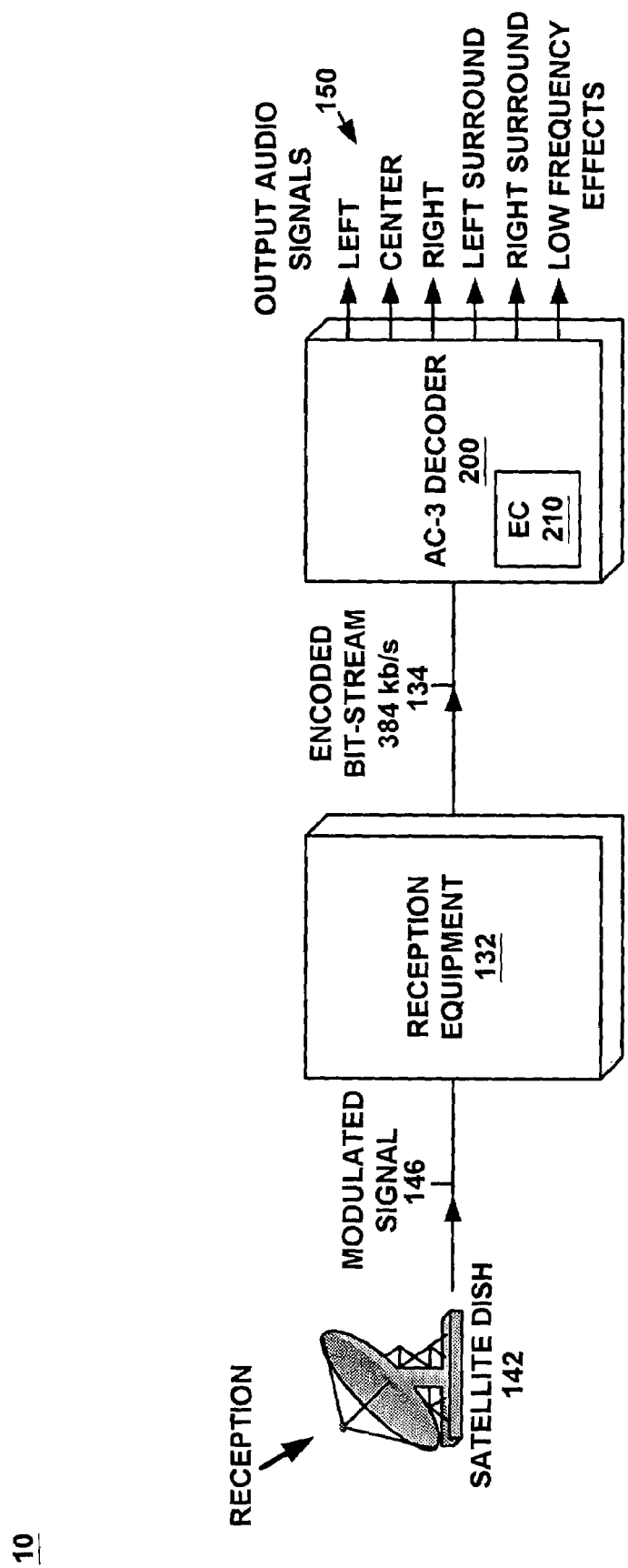

Embodiments of the present invention are directed to a digital audio decoder system 200 as shown in FIG. 1B. FIG. 1A and FIG. 1B together illustrate a multimedia communication system 10. In accordance with the system 10, a multimedia encoder system 120 accepts an audio signal (e.g., PCM audio) 115 and produces an encoded bitstream 122 based thereon. In one embodiment, this is an AC3 format compliant encoded signal which has a frequency of 384 kilobytes per second. This encoded bitstream is processed by transmission equipment 130 to produce a modulated signal 124 which can be transmitted 140, e.g., by a satellite dish or other suitable cable broadcast system, etc.

FIG. 1B illustrates the receiving system which includes receiver hardware 142 (satellite dish, cable receiver, etc.) and reception equipment 132 capable of converting the received modulated signal 146 to an encoded digital bitstream 134. It is appreciated that encoded bitstream 134 may vary from encoded bitstream 122 as a result of one or more signal errors that can be a result of transmission/reception problems. The encoded bitstream 134 is then fed to a digital decoder unit 200 which generates an output signal 150 that can be fed to a speaker system for rendering audible signals. The decoder system 200 of the present invention contains error concealment circuitry 210 for processing audio frames that have signal errors therein.

Figure 2:
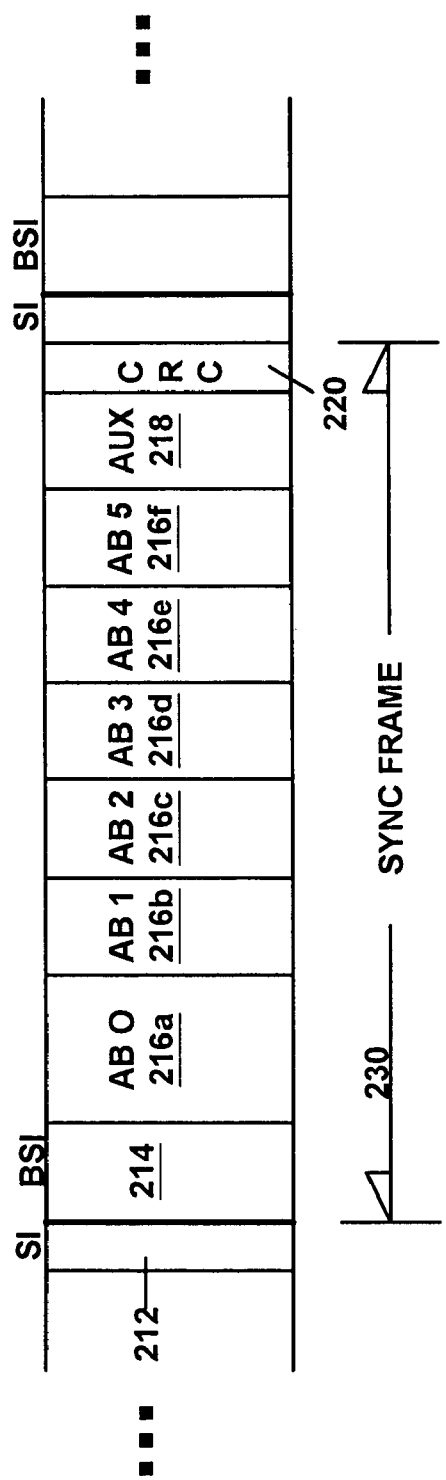
FIG. 2 illustrates an exemplary encoded audio frame of an encoded digital audio bitstream.

FIG. 2 illustrates a frame 230 of the encoded audio signal 134. An AC3 serial coded audio bitstream 134 is made up of a sequence of audio synchronization frames ("frames"). Each frame consists of 6 coded audio blocks (AB) 216a-216f each of which represent encoded data of 256 new audio samples. The samples are made at 48 kHz. When decoded, each frame 230 represents 32 ms of playback time. A synchronization information (SI) header 212 is located at the start of each frame 230 and contains information needed to acquire and maintain synchronization. A bitstream information (BSI) header 214 follows SI header 212, and contains parameters describing the coded audio service. The coded audio blocks 216 can be followed by an auxiliary data field 218. At the end of each frame is an error check field that includes a CRC (cyclic redundancy check) word 220 for error detection. An additional CRC word located in the SI header 212 is optional and can be included within each frame 230.

Figure 3A:
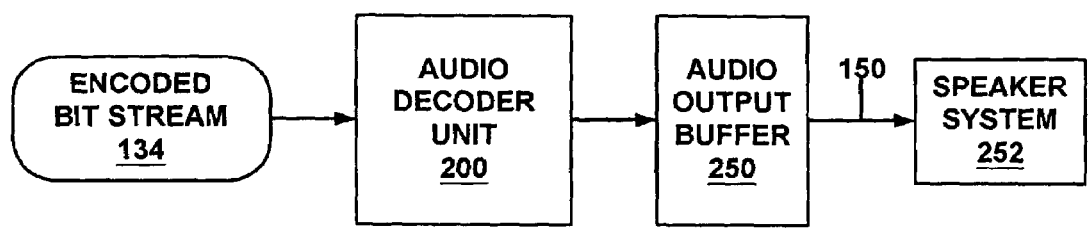
FIG. 3A is a block diagram of an audio decoding system in accordance with the present invention.

FIG. 3A is a logical block diagram of an decoder system in accordance with an embodiment of the present invention. The decoder unit 200 receives an encoded audio bitstream 134 and forwards decoded audio frames to an audio output buffer AOB 250. The AOB 250 contains several decoded frames, some of which are required as a result of audio-video delay. A read pointer marks the memory position at which audio frames are removed from the AOB 250 and sent over line 150 to the speaker system 252. A write pointer marks the memory position where new audio frames are received from the decoder unit 200. A circular buffer management technique can be used in the AOB 250.

Figure 3B:
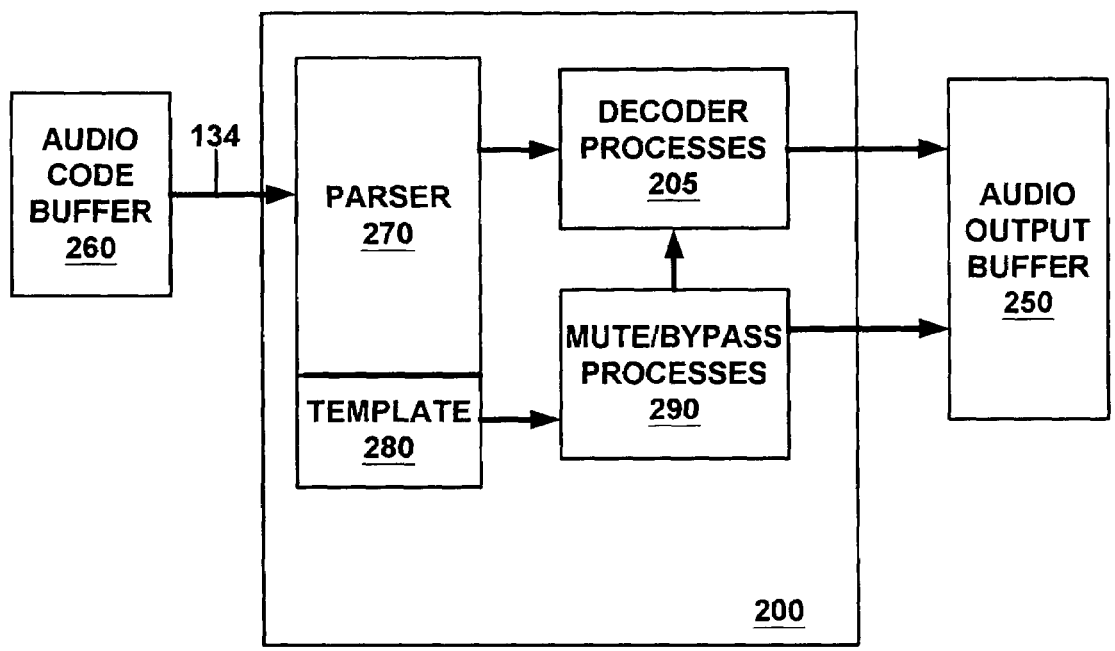
FIG. 3B is a block diagram of an audio decoding system having an error concealment circuit in accordance with one aspect of the present invention.

FIG. 3B illustrates a more detailed view of the decoder unit 200. Decoder unit 200 contains a parser 270, template processing unit 280, a decoder processing unit 205 and a mute/bypass processing unit 290. It is appreciated that the components of the decoder unit 200 can be realized using hardware circuitry or can be realized using software. The decoder processing unit 205 and the mute/bypass processing unit 290 both are coupled to the AOB 250. The parser 270 scans the input encoded bitstream 134 (which can originate from an audio code buffer 260). In one embodiment, the input bitstream 134 is compliant with the ATSC standard which includes an AC3 encoded bitstream for audio information. The template processing unit 280 determines whether or not a current frame is to be muted and therefore is an error concealment circuit. Template processing unit 280 functions in accordance with the steps of FIG. 4. If a particular frame is to be muted, that frame is called an error or mute frame, and is processed by the mute/bypass processing unit 290.

Adaptive Merging of Error Frames Based on Error Rate

Figure 4:
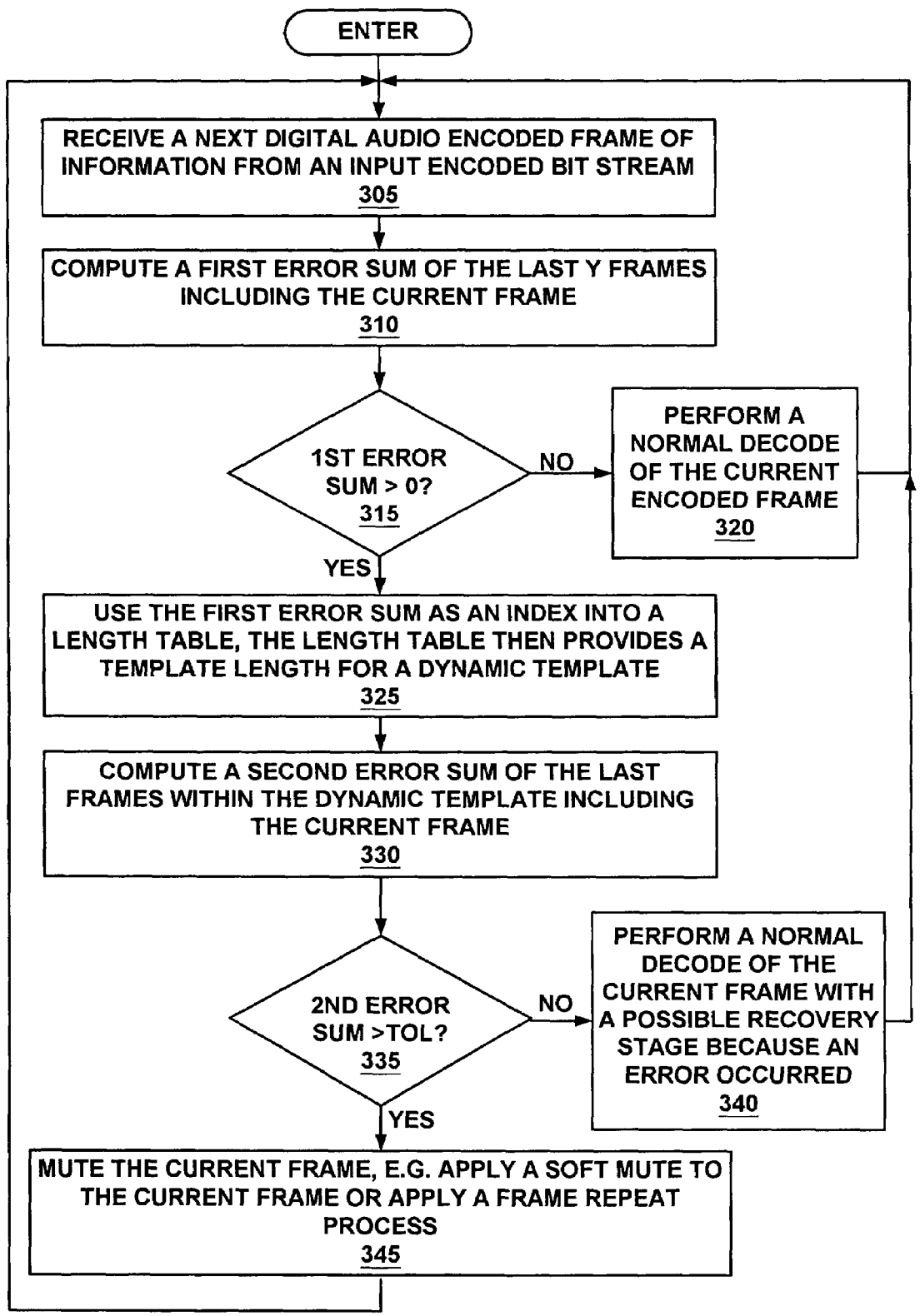
FIG. 4 illustrates steps in a process in accordance with one embodiment of the present invention for providing a dynamic error recovery delay with mute merging.
Figure 15:
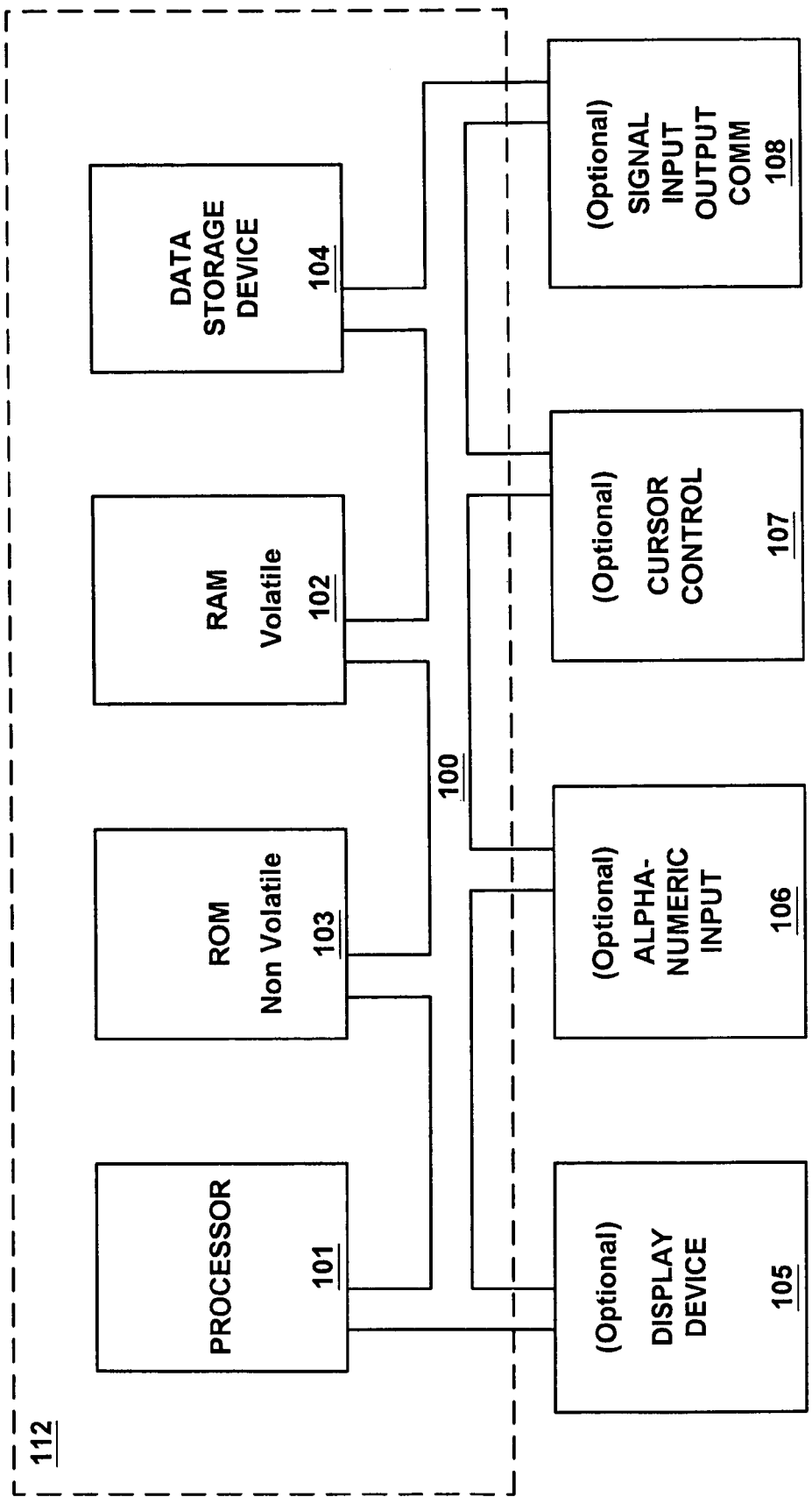
FIG. 15 is a block diagram of a computer system platform on which the error concealment and muting embodiments of the present invention can be practiced.

FIG. 4 illustrates steps in a process 280 in accordance with one embodiment of the present invention for providing a dynamic error recovery delay with mute merging. Process 280 can be realized in hardware or it can be realized in software. As software, process 280 is realized as instruction code executed by system 112 (FIG. 15). Process 280 operates by muting some non-error audio frames in order to merge two or more error frames into one longer silence period. This reduces the amount of annoying intermittent silence periods followed by sound and silence again in cases when the error rate is high. In this embodiment of the present invention, the length of the recovery delay is adaptive and depends on the amount of accumulated errors found in the input bitstream 134 (FIG. 3B).

Figure 5A:
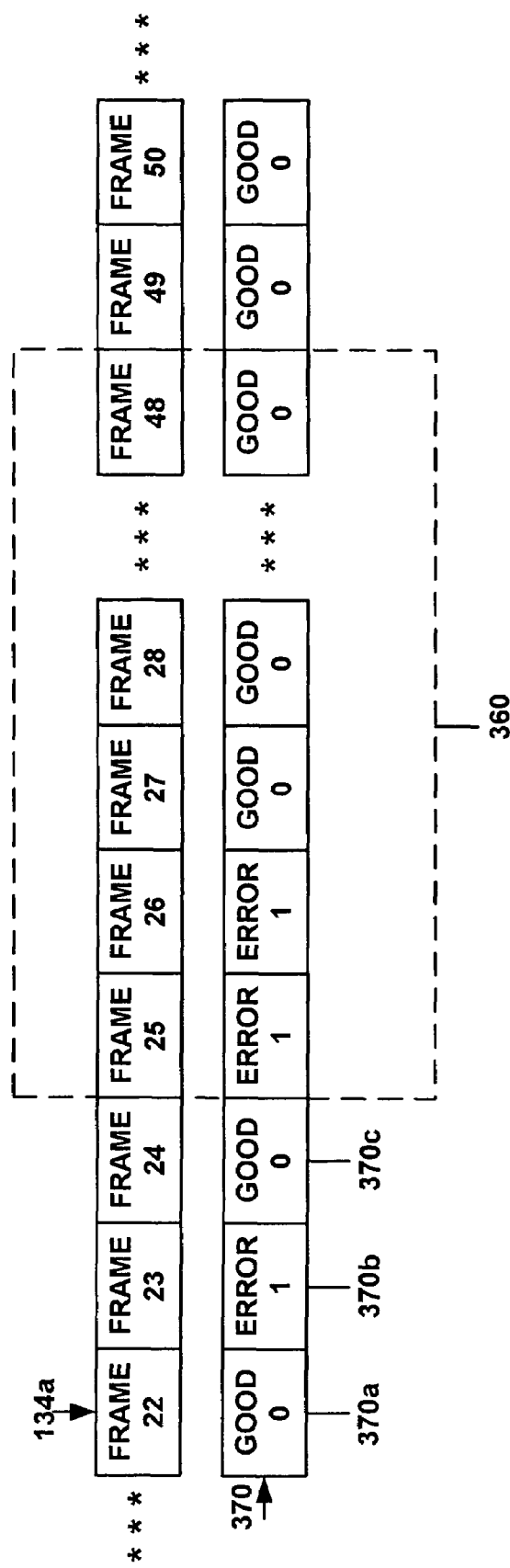
FIG. 5A illustrates a portion of the encoded digital audio stream and the fixed template used in accordance with the embodiment of the present invention shown in FIG. 4.

At step 305, a digital audio encoded frame is received by the decoder 200 from an input bitstream 134. An exemplary input bitstream 134a is shown in FIG. 5A and includes encoded frames 22-50. It is appreciated that each encoded frame also includes a corresponding array entry of error array 370. The individual entries of error array 370 are one bit in length and specify whether or not the encoded frame associated with the entry contains an error. In one embodiment, a "1" indicates an error and a "0" indicates no error. For instance, entry 370a corresponds to frame 22 and indicates a good frame. Entry 370b corresponds to frame 23 and indicates an error frame while entry 370c corresponds to frame 24 and indicates a good frame.

The error entries of error array 370 can be computed and stored by the parser process 270 of the decoder 200. There are several ways in which the AC3 data can indicate that errors are contained within a frame of encoded data. In one method, the decoder 200 can be informed of the error frame by the transport system which delivers the data. The data integrity can also be checked using the embedded CRC 220 fields for each encoded frame. Methods for using the CRC fields of an encoded frame for error detection are well known. Also, well known consistency checks on the received bitstream 134 can also be used to indicate that errors are present in a particular encoded frame. It is appreciated that at step 305 of FIG. 4, any of a number of well known processes can be used for generating the error array 370 of FIG. 5A based on the input bitstream 134. In the example of FIG. 5A, the next audio encoded frame that is being processed at step 305 is frame 48. All other frames of lesser frame number to frame 48 have already been processed by step 305 and are therefore previous frames.

At step 310 of FIG. 4, a first error sum value (sum_error1) is computed based on the error array entries of the last previous Y frames that were processed by step 305 including the current frame (e.g., frame 48). In one embodiment, the value of Y is a constant and can be selected based on a number of different considerations. In one implementation, Y=24. Using this example, the first error sum value is therefore computed based on the error entries of the error array 370 for frames 25-48. A first error template 360 is shown in FIG. 5A and includes the error entries of the last 24 frames that were processed by step 305. The first error template is called the static or fixed error template because its frame number is constant. The first error sum value is therefore the summation of all error entries that lie within the error template 360. It is appreciated that the first error template 360 moves along with the decoding process as new frames are processed by step 305. That is so say, the frames contained in the first error template 360 become updated when a new frame is processed by step 305. For instance, when frame 49 is the next processed frame, the frames of the error template 360 will include frames 26-49 and so on. It is appreciated that if the current frame contains an error therein, then the first error sum value (sum_error1) will always be greater than zero because the current frame is always included within the first error template 360.

At step 315, if the first error sum (sum_error1) is greater than zero, then step 325 is entered otherwise step 320 is entered. At step 320, no error was detected in the first template 360, therefore no muting operations are required and normal decoding can occur on the current frame. At step 320, a normal decode process is performed on the current frame (e.g., frame 48). In other words, no muting functions are applied to the current frame and decoding processes 205 (FIG. 3B) are applied to the current frame. After the decoding processes, the decoded frame is placed into the audio output buffer 250 at the position of the write pointer and eventually played out. Process 280 then returns to step 305 to obtain and process the next encoded frame.

At step 325, errors are detected in the first template 360 and muting operations need to be executed. At step 325, the value of the first error sum (sum_error1) is used as an index into a lookup table called the "length table." Although a variety of different length tables can be used, one exemplary length table is shown below:

int lengthtab[sum_error1]=(1, 1, 1, 1, 20, 19, 18, 17, 16, 15, 14, 13, 12, 11, 10, 9, 8, 7, 6, 5, 4, 3, 2, 1)

It is appreciated that the first three entries of the exemplary length table do not map to 23, 22 and 21 to avoid very long recovery delays.

Figure 5B:
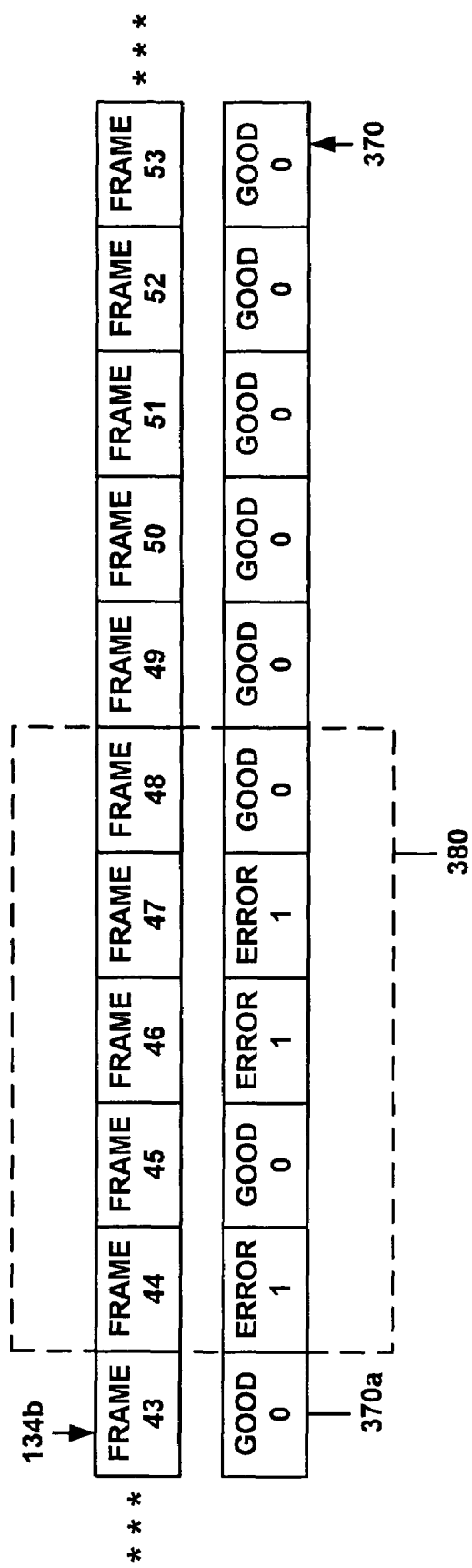
FIG. 5B illustrates a portion of the encoded digital audio stream and the dynamic template used in accordance with the embodiment of the present invention of FIG. 4.

The length table provides a length for a second error template that is dynamic in size and depends on the error rate of the input bitstream 134 as determined by the sum_error1 value. FIG. 5B illustrates an exemplary portion 134b of the input bitstream and also illustrates an example of the second error template 380 that spans from the current frame (frame 48) and has a length determined by the above length table. In this example, the length of the second error template is five frames long and includes previous frames 44-47 and the current frame 48. The second error template is called the dynamic or adaptive template because its length is not fixed but varies based on the error rate of the input bitstream.

At step 330 of FIG. 4, a second error sum value (sum_error2) is then computed based on the summation of the error entries of the error array 370 for the frames of the second error template 380. In this case, the second error sum value is 1+0+1+1+0 or 5. It is appreciated that if the current frame contains an error therein, then the second error sum value (sum_error2) will always be greater than zero because the current frame is always included within the second error template 380. At step 335, a check is made to determine if the second error sum is greater than a prescribed tolerance. The tolerance amount is programmable and in one embodiment, the tolerance amount is 0 and in another embodiment the tolerance amount is 1. If the second error sum is greater than the tolerance, then errors are found within the second error template 380 and at step 345 the current frame is muted (whether or not the current frame has an error therein). After muting, step 305 is entered to obtain and process the next frame. At step 340, the second error sum is not greater than the tolerance value and the normal decode process is performed on the current frame with an applied recovery stage. It is appreciated that step 340 is similar to step 320 except step 340 includes a recovery stage because at least one error was seen in the first template 360 and therefore a recovery from this error is being processed. After step 340, step 305 is entered again to obtain and process the next encoded frame.

It is appreciated that if the second error summation is greater than the tolerance, then the current frame is skipped and the output is muted (whether or not the current frame contains an error therein), otherwise, the current frame is normally decoded and played. In this way, the number of transition times from normal play to mute and from mute to normal play (unmute) is reduced. In effect, the muting strategy is extended across several non-error frames depending on the accumulated error rate so that short mutings are merged into a long muting. When the error rate is high, process 280 acts to merge together adjacent error frames (mute merging) by increasing the error recovery delay period. The amount of mute merging is adaptive and is based on the error rate.

Figure 6:
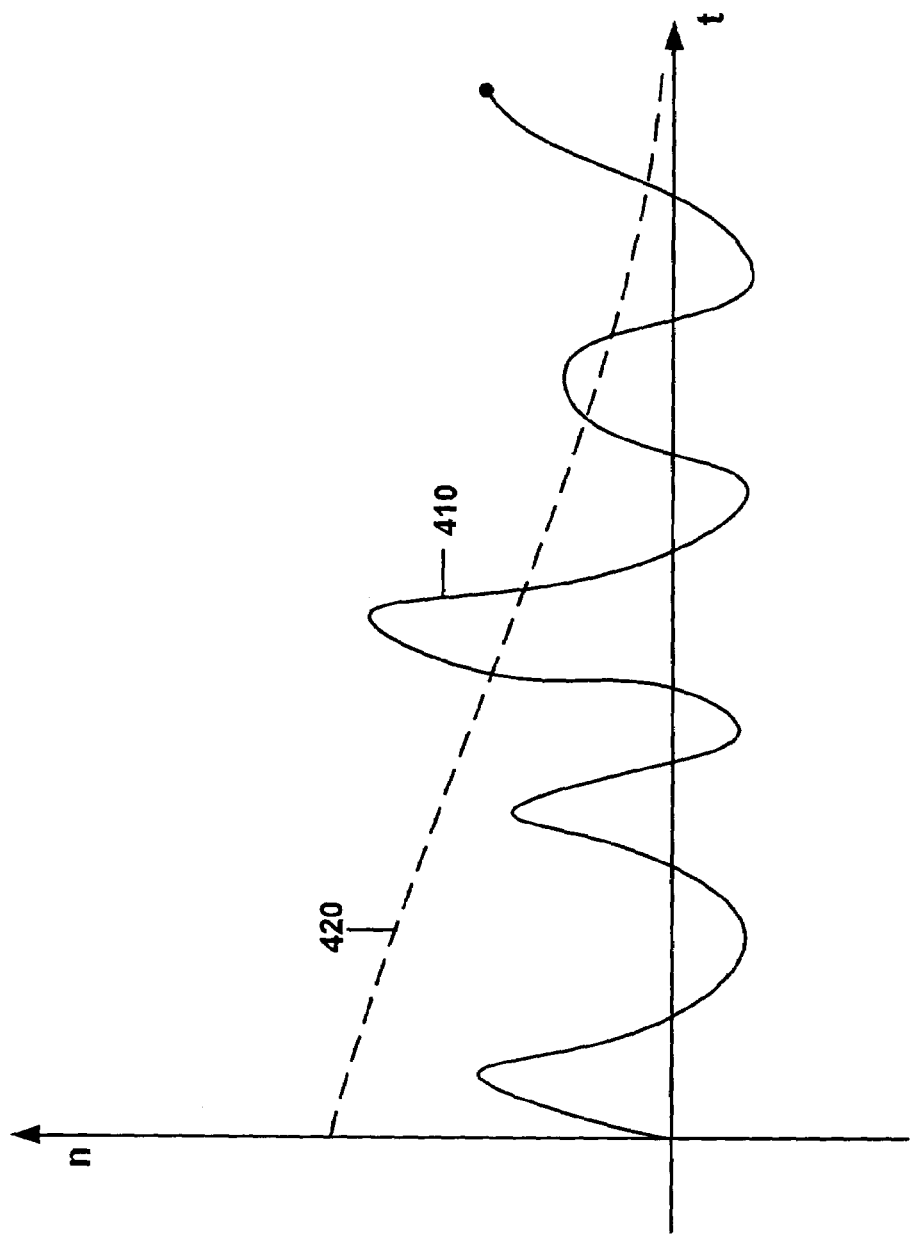
FIG. 6 illustrates an audio signal in accordance with a muted audio frame and a smoothing window function applied thereto.

At step 345, a number of different muting operations can be performed to mute the current frame. In the preferred embodiment, a smooth muting with zeros can be applied to decline the audio signal at a given rate according to a window function and in an alternate embodiment, a frame repeat can be performed. FIG. 6 illustrates smooth muting with zeros to reduce the "pop" sounds associated with muting. In this embodiment, an attenuation or "window" function 420 is applied to the decoded audio frame represented as signal 410 to decline its amplitude. Windowing starts at the zero-cross point. The attenuation function represents the amount of the original signal 410 allowed to exist at any given time and the remainder of the audio signal is padded (e.g., replaced) with zeros to provide a mute. Smoothing functions and muting using window functions are well known.

The selection of the length of the second template 380 is made variable and adapts based on the length table indexed by the error occurrence frequency. Under the premise of merging intermittent errors over the past frames, the length of the second template 380 should be as small as possible to minimize error recovery delay. However, two competing interests need to be satisfied. On one hand, (a), when the length of the second template 380 is large, the benefit is that intermittent errors over several frames can be merged into a longer mute, but the down side is that error recovery delay is longer. On the other hand, (b), when the length is small, the down side is that intermittent errors are not merged and this causes intermittent sound, but the benefit is that error recovery delay is shorter. To satisfy both of these interests, the following relationships can be used. To satisfy (a), the template length of template 380 plus the sum_error1 should be greater than or equal to (Y+1) where Y was the length of the fixed template 360. To satisfy (a) and (b), the template length of template 380 should be equal to (Y+1−sum_error1). These relationships are used to determine the entries of the table length lookup table.

It is appreciated that process 280, while described with respect to the AC3 data format, can also be applied to other audio encoding formats such as MPEG audio, AAC and DV audio, etc.

Frame Repeat for Single Frame Mutes

Error concealment can be performed in lieu of soft muting in cases where there are only 1 or 2 error frames in a row because error concealment, using frame repeating, is barely audible in these cases whereas soft muting often creates a small audible mute interval. Therefore, in those cases when the error rate of the bitstream 134 is not high, e.g., the frames in the neighborhood of the error frame have a few to no errors, a single error concealment operation is performed in accordance with one embodiment of the present invention. A single error concealment operation can be performed by repeating the previous non-error frame of the error frame. This operation can also be applied to two consecutive frame errors that follow a non-error frame. To achieve a smooth transition between the repeated frame and the previous frame, an overlap-add of the delay of the last block of the previous frame and the PCM data of the first block of the repeated frame is performed. Also, to achieve a smooth transition between the repeated frame and the following (next) frame, an overlap-add of the delay of the last block of the repeated frame and the PCM data of the first block of the following frame is performed. The implementation is performed in the time-domain rather than the code-domain as a result of certain hardware considerations. Frame repeat can be performed for two or three frames with errors therein. Applying repeating to more than three consecutive error frames can create distortion. Therefore, in these cases, the muting process as described with respect to FIG. 4 is thus applied.

Figure 7:
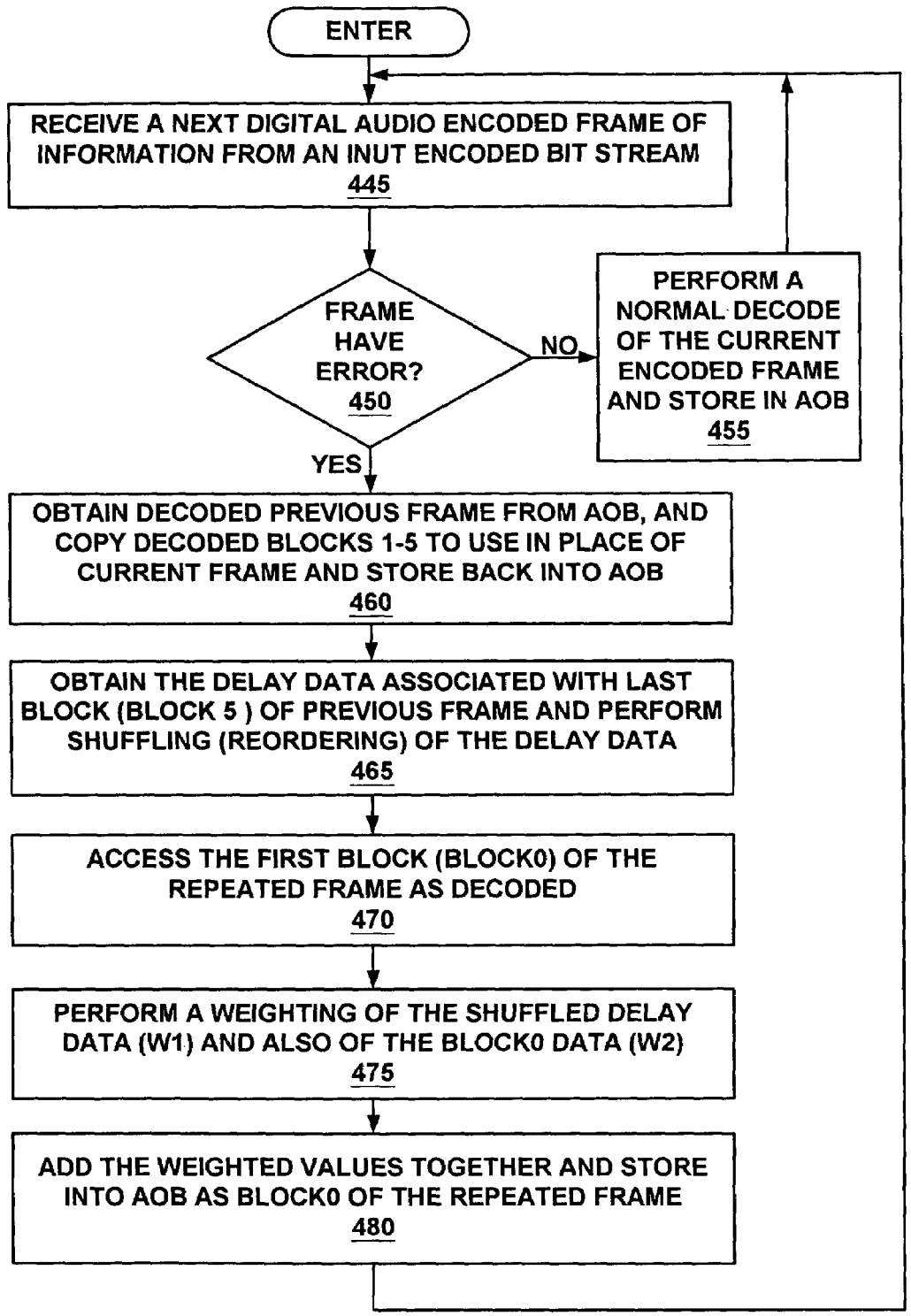
FIG. 7 illustrates steps in a process in accordance with an embodiment of the present invention for perform frame repeating for a single frame muting operation.

FIG. 7 illustrates steps in a process 440 of one embodiment of the present invention for repeating the previous frame of an error frame to perform error concealment. The replication is performed in the time domain and special data manipulations are performed to produce smooth signal transition at the frame interfaces. Process 440 can be realized in hardware or it can be realized in software. As software, process 440 is realized as instruction code executed by system 112 (FIG. 15). At step 445, a next audio encoded frame of information is received from the input bitstream 134 and is referenced as the current encoded frame (e.g., frame n). A check is made at step 450 to determine if an error is present within the current encoded frame. This determination can be made by the parser process 270. If the current encoded frame indicates that no error is present, then step 455 is entered where a normal decode of the current encoded frame is performed and the decoded audio frame is stored in the audio output buffer 250 for playout. Step 455 is analogous to step 320 of FIG. 4. It is appreciated that the presence of an error can be determined at step 450 using the same error detection techniques described with respect to FIG. 4.

If an error is detected in the current encoded frame, then step 460 is entered. At step 460, the decoded version of the previous frame is obtained from the audio output buffer 250 and the PCM data from blocks 1-5 of the previous frame are directly copied and used in place of blocks 1-5 of the current encoded frame.

Figure 8:
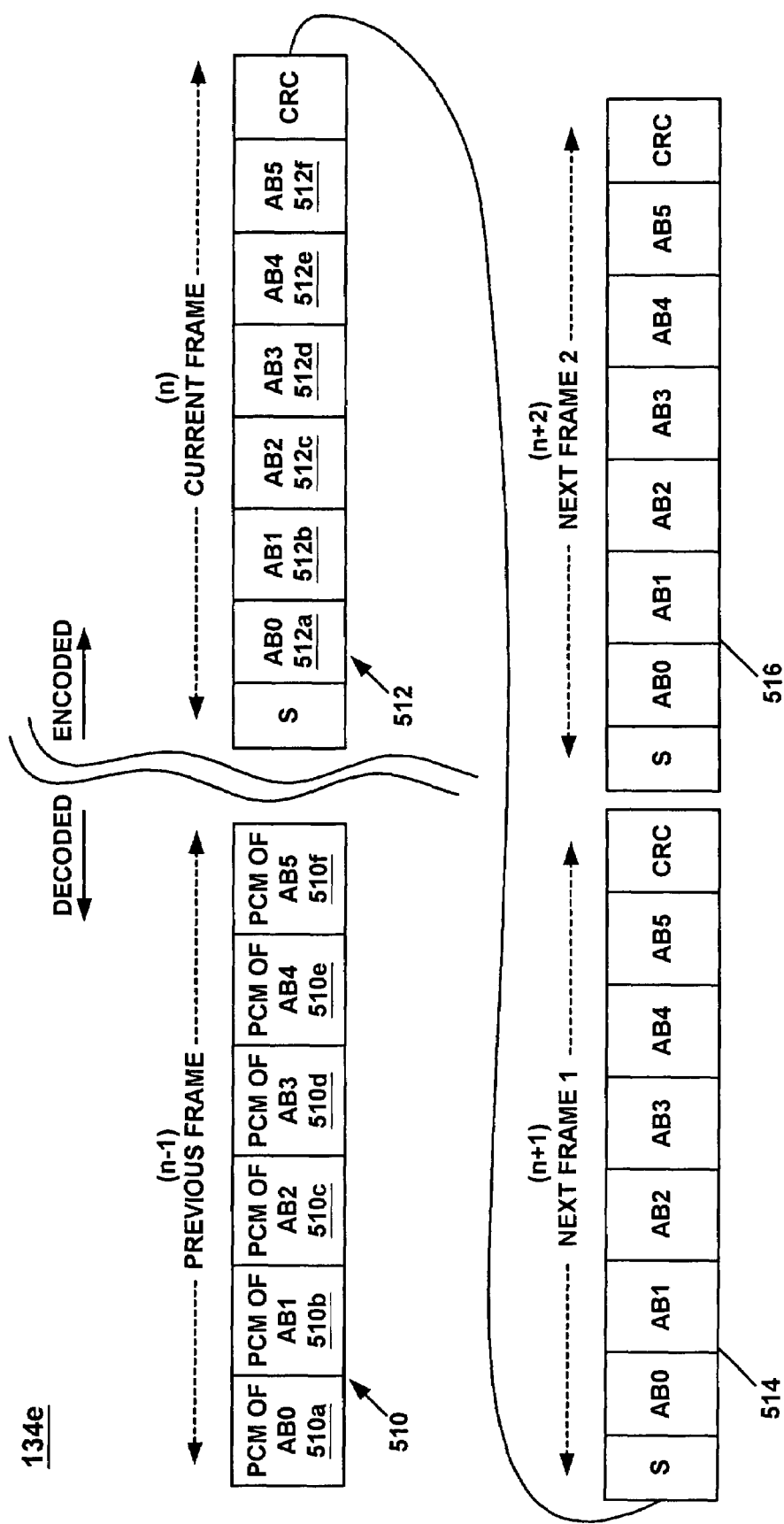
FIG. 8 illustrates a portion of the encoded audio bitstream having a single frame to be muted in accordance with the embodiment of the present invention of FIG. 7.
Figure 9:
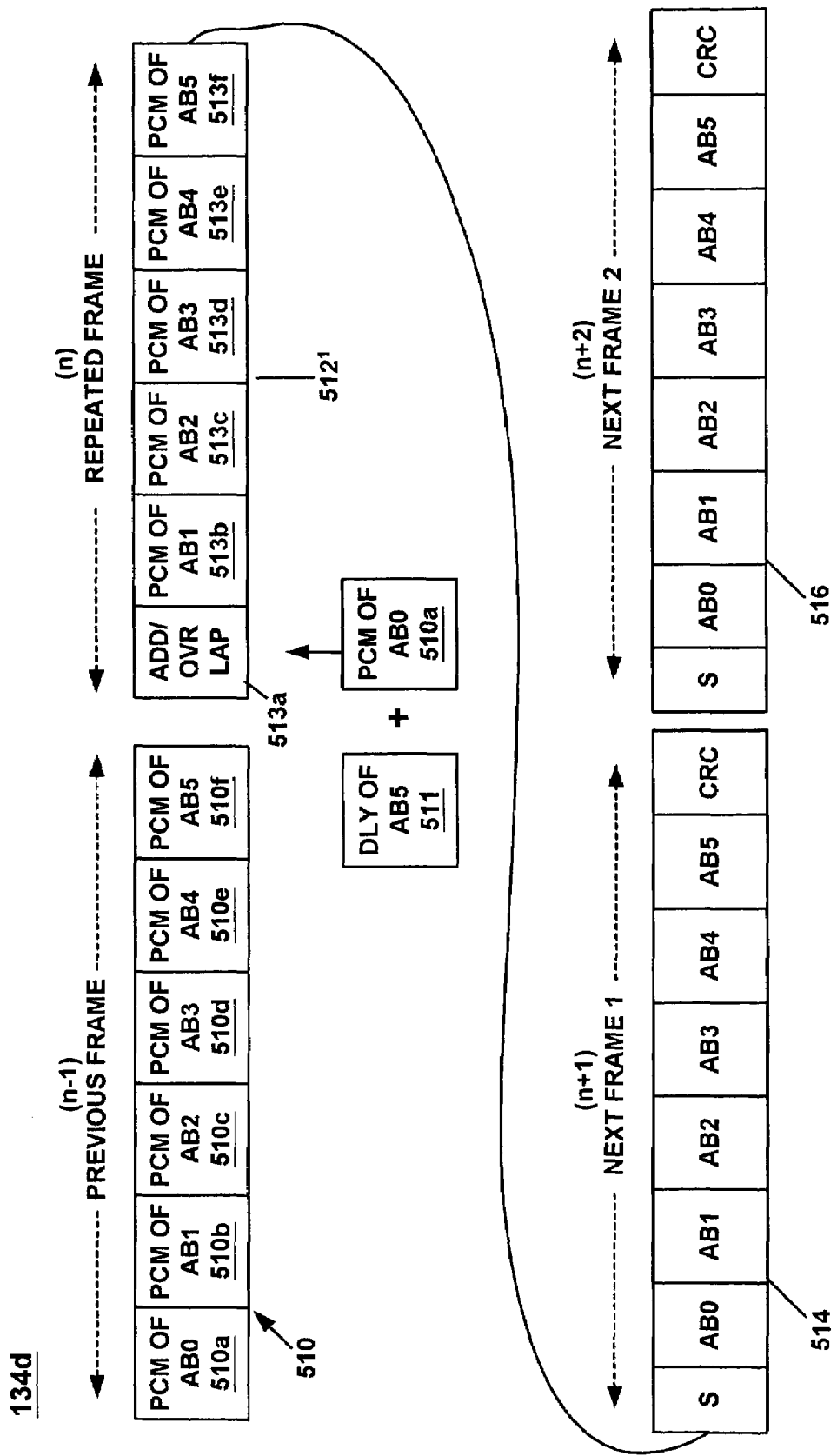
FIG. 9 illustrates the portion of the encoded audio bitstream of FIG. 8 after frame repeating in accordance with the embodiment of the present invention of FIG. 7.

FIG. 8 and FIG. 9 illustrate an example. FIG. 8 illustrates a portion 134c of the bitstream including a current encoded frame 512 (having a detected error), a previous decoded frame 510 (frame n−1) and two next frames 514 (n+1) and 516 (n+2) which remain encoded. At step 460, the PCM (pulse code modulation) data associated with blocks 1-5 of the previous frame 510, e.g., data 510b-510f, are copied and used as the decoded data for the current frame 512. FIG. 9 illustrates this replacement with the PCM data 513b-513e (of the repeated frame 512') being a direct copy of PCM data 510b-510e of the previous frame 510. The PCM data for the previous frame 510 is obtained from the audio output buffer 250 because this frame 510 has already been decoded by decoder 200. As shown in FIG. 9, the resultant modified current frame 512' (now called the repeated frame) contains the same PCM data representative of blocks 1-5 as the previous frame 510.

At step 465 of FIG. 7, the delay data (from the delay array) associated with the last block (AB5) 510f of the previous frame 510 is obtained and data shuffling is performed on this delay data. The delay array is a specified data structure that for use in decoding next frames and is specified by Dolby. FIG. 9 illustrates this delay data as 511. At step 470, the PCM data associated with the first block (AB0) 510a of the pervious frame 510 is accessed. At step 475, well known weighting functions are applied to the delay data 511 and to the PCM data 510a of steps 465 and 470. At step 480, the results of the weighting functions are added together (as shown in FIG. 9) and stored as the resultant PCM data used for the first block 513a of the repeated frame 512'. Once the repeated frame 512' has been fully constructed with PCM data 513a-513f, it is forwarded to the audio output buffer 250 for playout. The result is that the delay data associated with the last block of the previous frame 510 is added and overlapped with the first block of the repeated frame 512' to smooth out the interface between these frames. Since only the decoded PCM data of the previous frame 510 is used above, the compressed code of the previous frame 510 is not necessary for process 440 and time-consuming decoding processes are not used, but rather, what is used is a weighted overlap-add function. It is appreciated that if the next frame (frame 514) is also in error, the above process 440 can be repeated for this next frame.

In an alternative embodiment, the same function can be applied to the interface between the repeated frame 512' and the next frame 514. More specifically, this embodiment of the present invention also adds the delay associated with the last block (AB5) of the repeated frame 512' with the PCM data associated with the first block (AB0) of the next frame 514 (with appropriate data shuffling and weighting) to smooth the interface between these frames.

Reduced Audio Frame Over-Run in Muting Operation

An embodiment of the present invention provides a method for reducing the number of audio frames that are played out subsequent to a mute command. A mute command can arise incident to a channel change command, e.g., a viewer decides to change a watched channel from channel A to channel B. When the change channel command is received by the decoder 200, it immediately freezes the current video frame as indicated by the read pointer of the video output buffer. The audio output, however, cannot be stopped immediately because it is synchronized as the slave to the video signal and the respective durations of the audio and video frames are different. This embodiment of the present invention reduces the number of audio frame over-runs, that is, the number of audio frames that are played out subsequent to the video freeze in a channel change situation.

Figure 12:
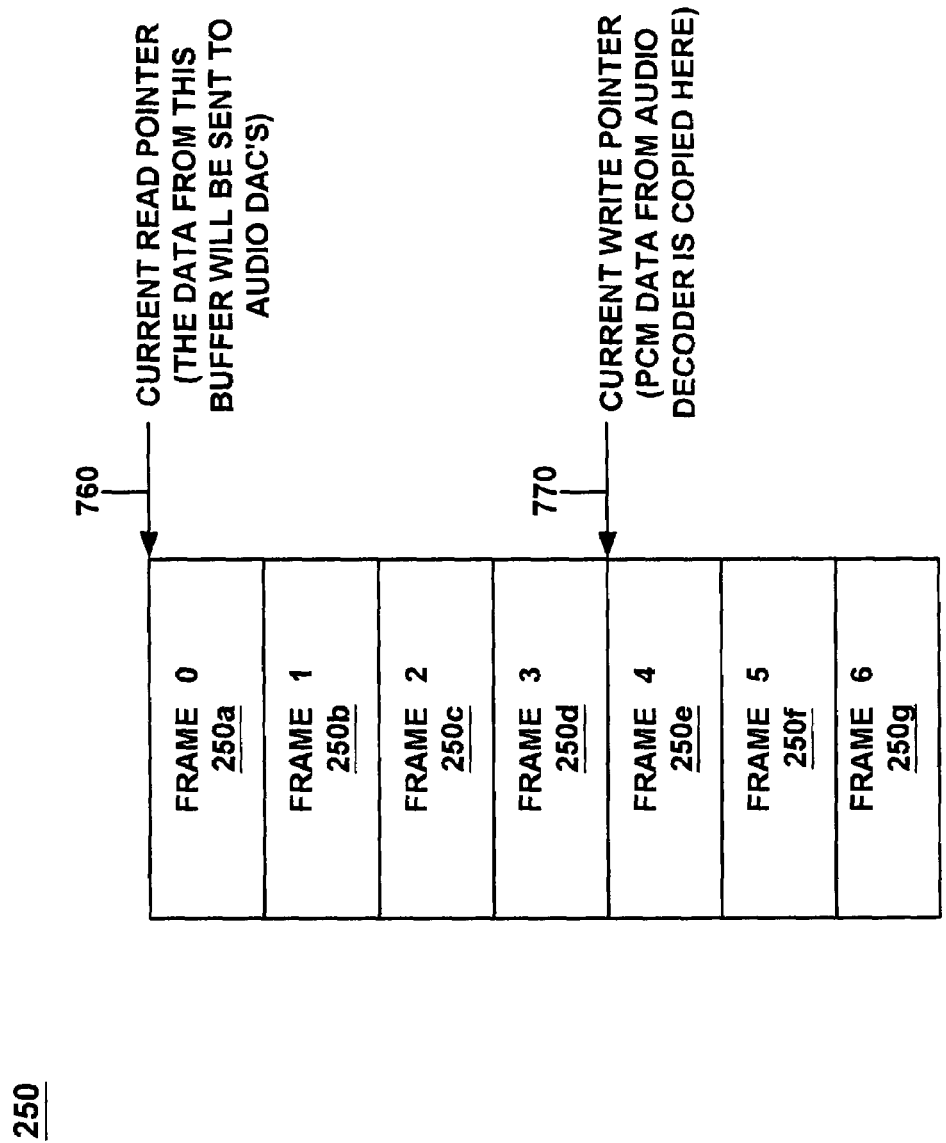
FIG. 12 illustrates the contents of the audio output buffer of an audio decoder system.

FIG. 12 illustrates an exemplary audio output buffer 250 containing storage (entries 250a-250g) for at least 7 decoded audio frames (descriptor0-descriptor6). Although not shown, there is a cor The just decoded audio frames are stored at the write pointer 770 and the audio frames to be played out are read from the read pointer 760 of the audio output buffer 250. The audio output buffer 250 is a circular buffer and therefore the read and write pointers are cyclic. After a read or a write, the corresponding pointer is incremented by one. There is a difference between the read and write pointers of about three to four entries in the buffer 250 to account for the well known delay or "lag" between the video and the audio information. Because it can take a relatively long time to restart the read and write pointers to their proper positions and update sequences, it is not desirable to halt the read and write pointers in response to a mute command. If this were done, there would be a slight delay noticed upon entering the next channel (e.g., channel B) after a channel change while these pointers become re-initialized. Therefore, this embodiment of the present invention provides a method for reducing audio over-run without halting the operation of the read and write pointers.

Figure 11:
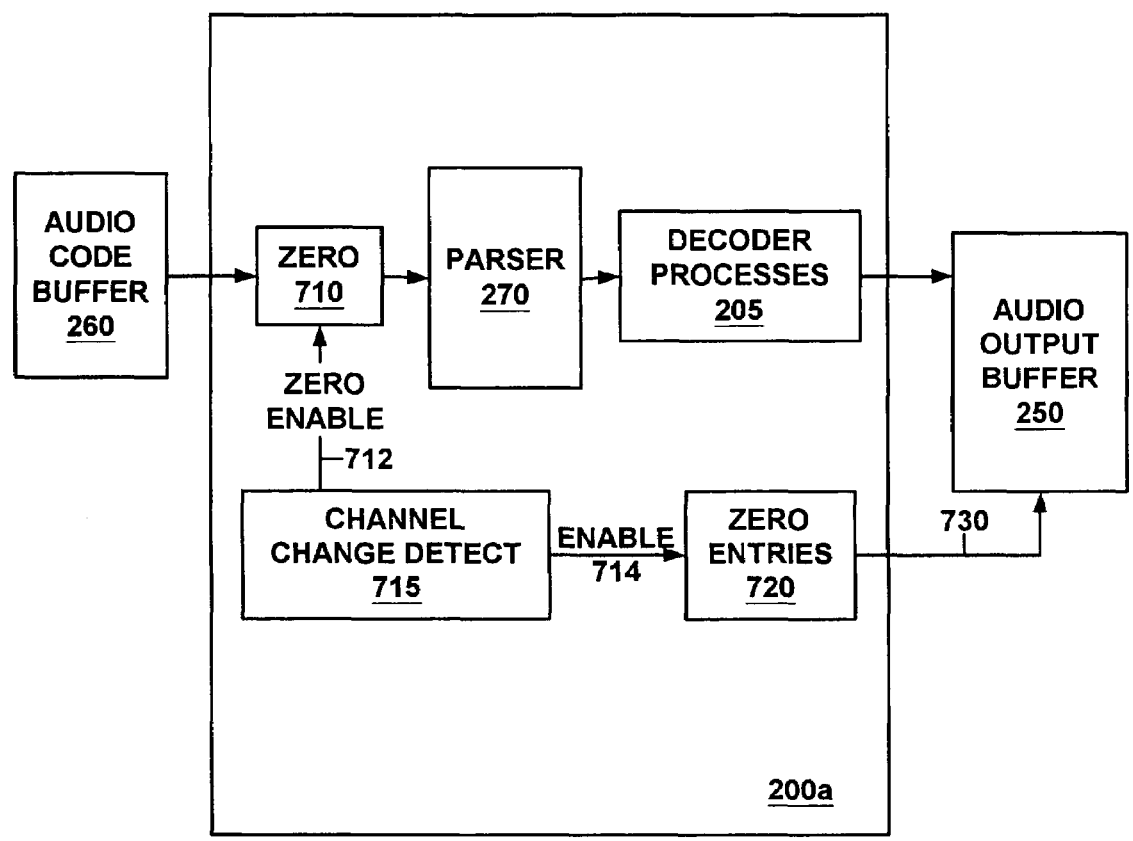
FIG. 11 is a block diagram of a decoder unit in accordance with the embodiment of the present invention of FIG. 10.

FIG. 11 illustrates a decoder unit 200 in accordance with this embodiment of the present invention. The decoder unit 200a is similar to the decoder 200 of FIG. 3B except for a channel change detect logic block 715 which generates control signals 712 to a first zero block 710 and also generates control signals 714 to a second zero block 720. The first zero block 710 is responsible for zeroing the encoded audio bitstream subsequent to a mute command received over line 712. By zeroing the input audio encoded bitstream when a mute command is received, this effectively will provide zeroed audio frames starting from the position of the write pointer 770 of the audio output buffer 250. This is shown by FIG. 13 with frames 4-7 being zeroed.

Figure 13:
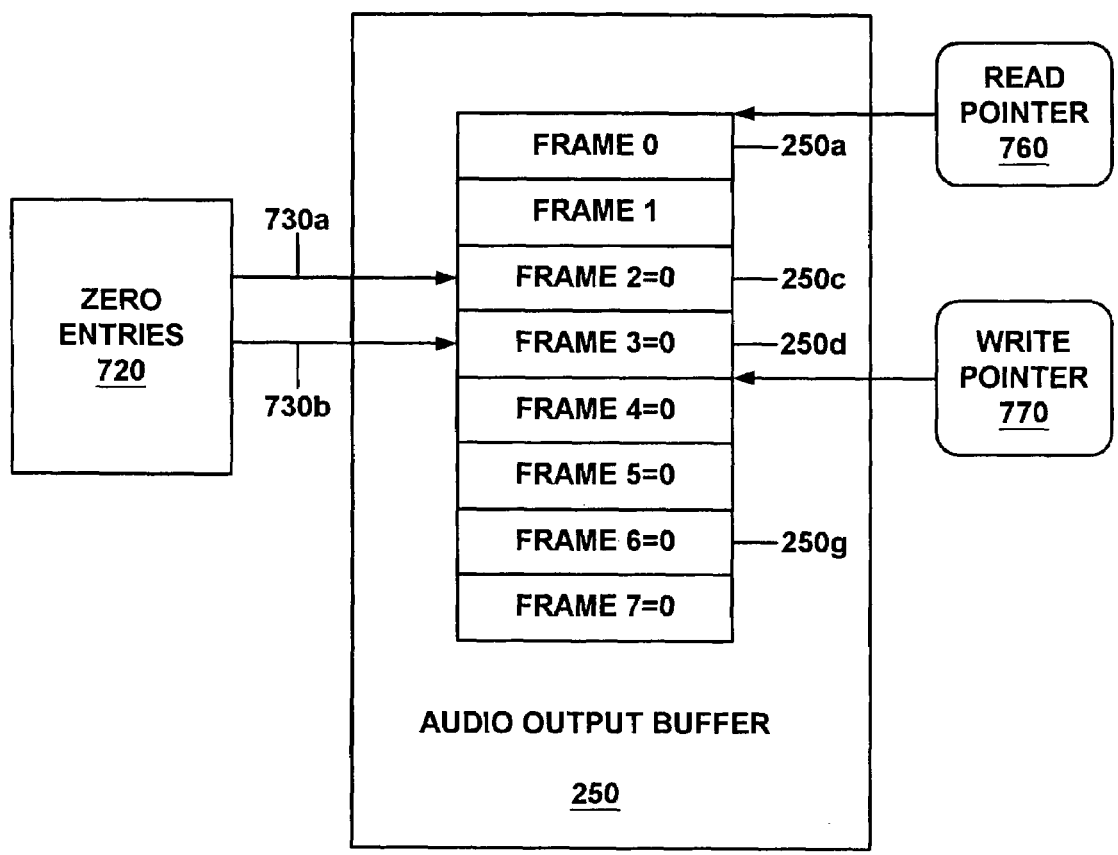
FIG. 13 illustrates the contents of the audio output buffer of an audio decoder system after frame zeroing in accordance with the embodiment of the present invention of FIG. 10.

FIG. 13 assumes a mute command was received when the write pointer 770 was at frame 4. Therefore, the decoder 200a gets system commands from a command module to either decode the next audio frame or mute all the preceding frames in the decoder 200a.

The second zero block 720 also receives a mute command over line 714 and functions to zero all frames between (1) the write pointer 770 and (2) two frames above the write pointer 770. In the example of FIG. 13, the frames that are zeroed by the second zero block 720 are frame 2 250c and frame 3 250d.

The second zero block 720 does not zero frame 0 of FIG. 13 because the read pointer 760 may be pointing on this frame and playing it out when the channel change occurs. Frame 1 may or may not be windowed to smoothen the audio. Although frames are zeroed in the audio output buffer 250, the write and read pointers are allowed to run normally. FIG. 13 therefore illustrates an exemplary state of the audio output buffer 250 subsequent to a mute command in accordance with this embodiment of the present invention. In this example, at most two decoded audio frames will be played out subsequent to the mute command (e.g., frame 0 and frame 1). It is appreciated that two audio frames (e.g., 64 milliseconds in duration together) is not typically audible.

Figure 10:
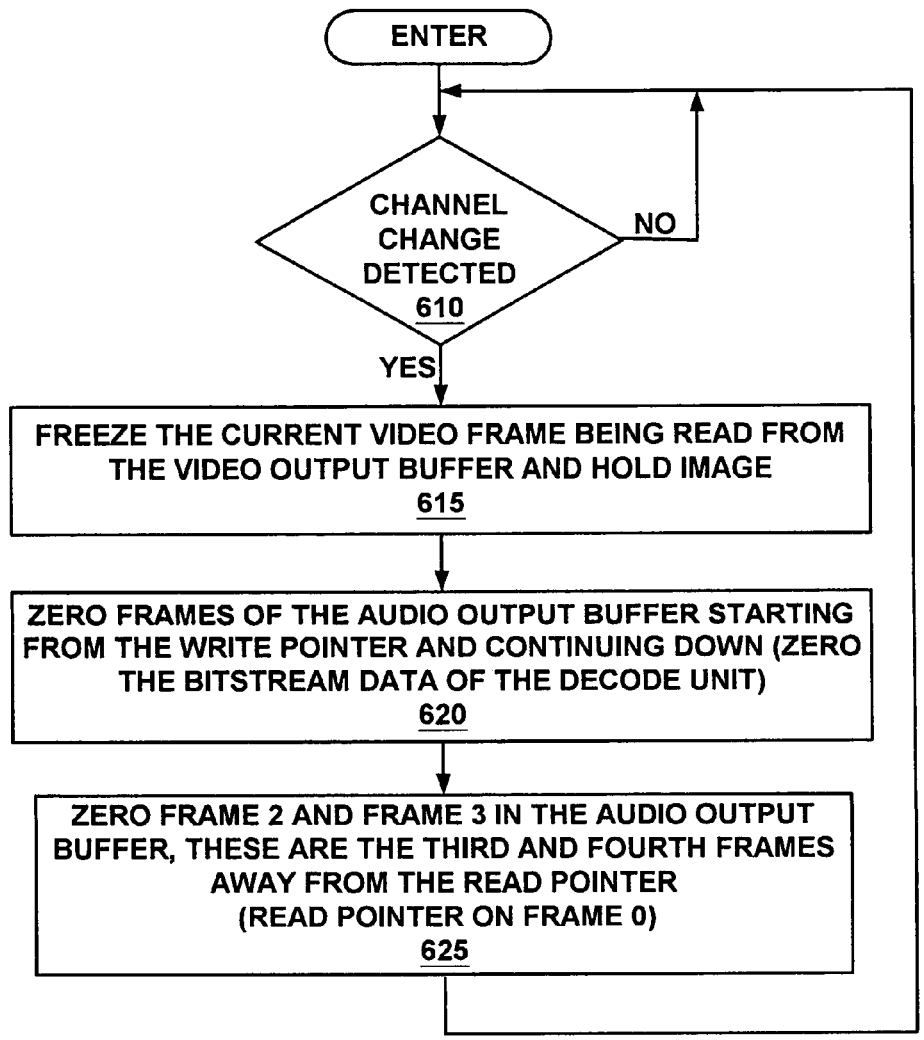
FIG. 10 illustrates steps in a process in accordance with an embodiment of the present invention for reducing the number of audio frames played back following an audio mute command.

FIG. 10 illustrates the steps in accordance with this embodiment of the present invention. Process 600 can be realized in hardware or it can be realized in software. As software, process 600 is realized as instruction code executed by system 112 (FIG. 15). Step 610 looped until a channel change is detected or otherwise an audio mute is required. At step 615, the current video frame being output by the video output buffer 250 is held thereby freezing the frame on the display device or monitor. At step 620, an audio bitstream of the decoder is zeroed, thereby causing the decoded audio data (associated with the old channel) that is present within the audio buffer 250 to become zeroed starting at the write pointer position. As discussed above, this will zero all frames of the audio output buffer 250 starting from the write pointer 770 and counting down the buffer. At step 625, the decoder directly zeros two decoded audio frames above the write buffer. A number of well known windowing functions can be applied to these frames to perform the zeroing operation. As discussed above, with respect to FIG. 13, step 625 effectively zeros frames 2 and 3. In the typical case, there are four audio frames between the read and write pointer 770, so frames 2 and 3 also represent the second and third frames away from the read pointer 760. The audio decode and playback processes are then allowed to operate normally and process 600 returns to step 610.

The above process 600 can be applied to a number of well known encoding standards, for example, AC3, AAC, MPEG-Audio and DV audio. Process 600 can also be applicable in a situation where the audio interface is supposed to be transmitting zero data right from the system boot-up even when there is no actual data (e.g., IEC60958). A variation of the above approach can be used to implement that condition. Process 600 can be used by any audio interfaces transmitting linear PCM data, for instance, ACLINK, IEC60958, or IIS.

Figure 14:
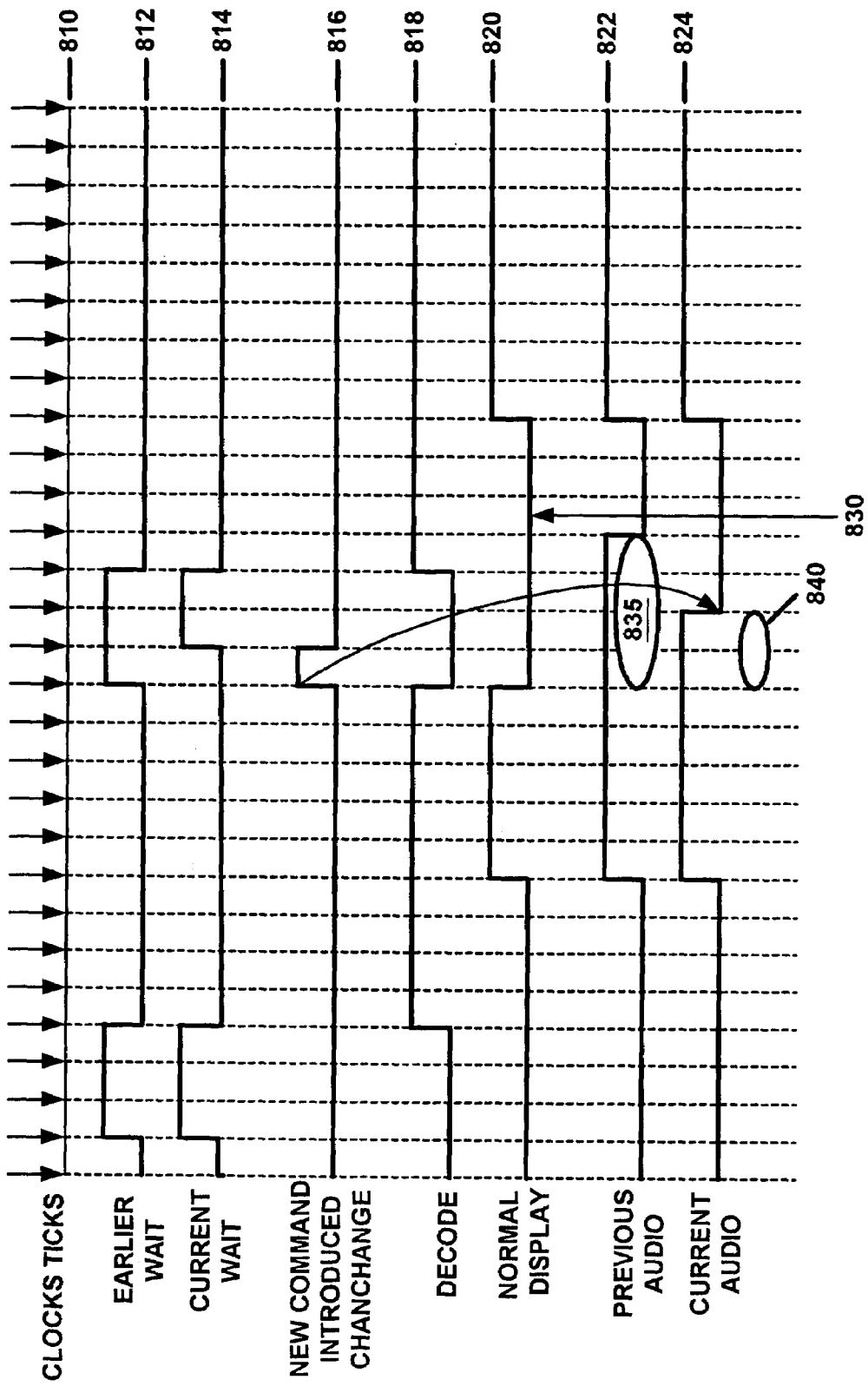
FIG. 14 illustrates a timing diagram of signals involved in the embodiment of the present invention of FIG. 10.

FIG. 14 illustrates a timing diagram of the above operations. Signal 816 is the channel change command which simultaneously generates an audio mute signal at the indicated pulse. Signal 818 represents the state of the decoding logic and, as shown, it drops down three cycles after the mute command pulse of signal 816. This represents the input audio encoded bitstream being zeroed by the first zero logic 710. Signal 820 represents the video display and subsequent to the mute command pulse of signal 816, it enters a freeze frame as shown by interval 830. Signal 822 illustrates the operation of the audio playback of the prior art method and includes four audio over-run frames 835 that are played out after the video freeze commences. Signal 824 illustrates the operation of the audio in accordance with this embodiment of the present invention. In accordance with signal 824, only two audio frames 840 are played out subsequent to the start of the video freeze. By reducing the audio frame over-run by at least two frames, the present invention is able to eliminate the annoying and confusing sounds that often result from a channel change operation of the prior art.

Computer System Platform

Embodiments of the present invention can be implemented within a computer system. FIG. 15 illustrates a computer system 112 that can be a general purpose computer system or it can be an embedded system within an electronic device, such as an intelligent device, an AV decoder system, a set-top-box, a receiver unit, a digital television unit, etc. Computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 of FIG. 15 is an optional alphanumeric input device 106 including alphanumeric and function keys coupled to the bus 100 for communicating information and command selections to the central processor 101. System 112 also includes an optional cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. The display device 105 utilized with the computer system 112 is optional and may be a liquid crystal device, cathode ray tube (CRT), field emission device (FED, also called flat panel CRT) or other display device suitable for creating graphic images and alphanumeric characters recognizable to the user.

The preferred embodiment of the present invention, a digital audio decoder system for a multimedia information system having improved error concealment functionality, improved muting capabilities and reduced audio frame over-run in response to a mute command, is thus described. While the present invention has been described in particular embodiments, it should be appreciated that the present invention should not be construed as limited by such embodiments, but rather construed according to the below claims.

What is claimed is:

1. In a digital decoder unit, a method for reducing audio frame over-run comprising the steps of:
 a) receiving an audio encoded bitstream, decoding said encoded bitstream and storing decoded audio frames into an audio output buffer;
 b) responsive to an audio mute signal, causing an audio bitstream of said decoder unit to zero, said step b) causing entries in said audio output buffer to zero starting from an entry position pointed to by a write pointer associated with said audio output buffer; and
 c) directly zeroing a plurality of entries of said audio output buffer in response to said audio mute signal, said plurality of entries being a few entries away from a read pointer of said audio output buffer, said read pointer following said write pointer and wherein as a result of step b) and step c), only a predetermined number of audio output frames are guaranteed to be played after said audio mute signal is detected.

2. A method as described in claim 1 further comprising the step of d) freezing a current video frame on a display screen in response to said audio mute signal being detected and wherein said audio mute signal is generated as a result of a channel change command.

3. A method as described in claim 1 wherein said read pointer and said write pointer are separated by a predetermined number of entries and wherein said audio output buffer is a circular buffer.

4. A method as described in claim 3 wherein said predetermined number of entries is four and wherein said predetermined number of audio output frames is two.

5. A method as described in claim 1 wherein said encoded bitstream is substantially compliant with the AC3 digital audio standard.

6. A method as described in claim 1 wherein step c) is performed using a windowing function.

7. In a digital decoder unit, a method for reducing audio frame over-run comprising the steps of:
 receiving an audio mute signal;
 zeroing an audio bitstream of said decoder in response to said audio mute signal; and
 zeroing entries in an audio output buffer starting from an entry position pointed to by a write pointer associated with said audio output buffer said entries being away from a read pointer of said audio output buffer, said read pointer following said write pointer and wherein only a predetermined number of audio output frames are guaranteed to be played after said audio mute signal is received.

8. A method as described in claim 7 wherein said read pointer and said write pointer are separated by a predetermined number of entries and wherein said audio output buffer is a circular buffer.

9. A method as described in claim 7 further comprising the step of:

freezing a current video frame on a display screen in response to receiving said audio mute signal, wherein said audio mute signal is generated as a result of a channel change command.

10. A method as described in claim 8 wherein said predetermined number of entries is four and wherein said predetermined number of audio output frames is two.

11. A method as described in claim 7 wherein said audio bitstream is encoded and is substantially compliant with the AC3 digital audio standard.

12. A method as described in claim 7 wherein a windowing function guarantees said predetermined number of audio output frames.

* * * * *